No. 650,950. Patented June 5, 1900.
L. W. RAVENÈZ.
MOTOR VEHICLE.
(Application filed Mar. 3, 1898.)
(No Model.) 5 Sheets—Sheet 4.

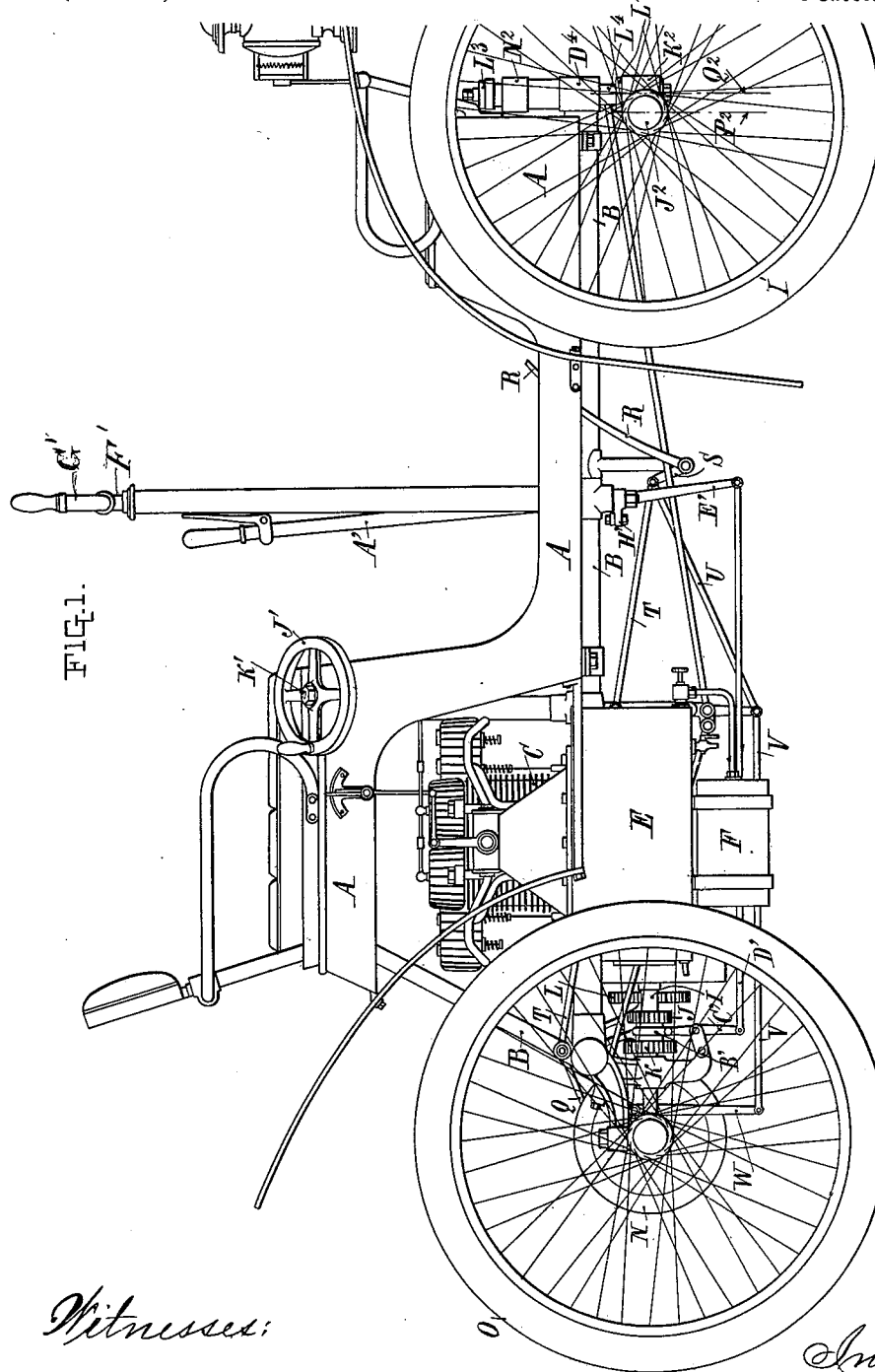

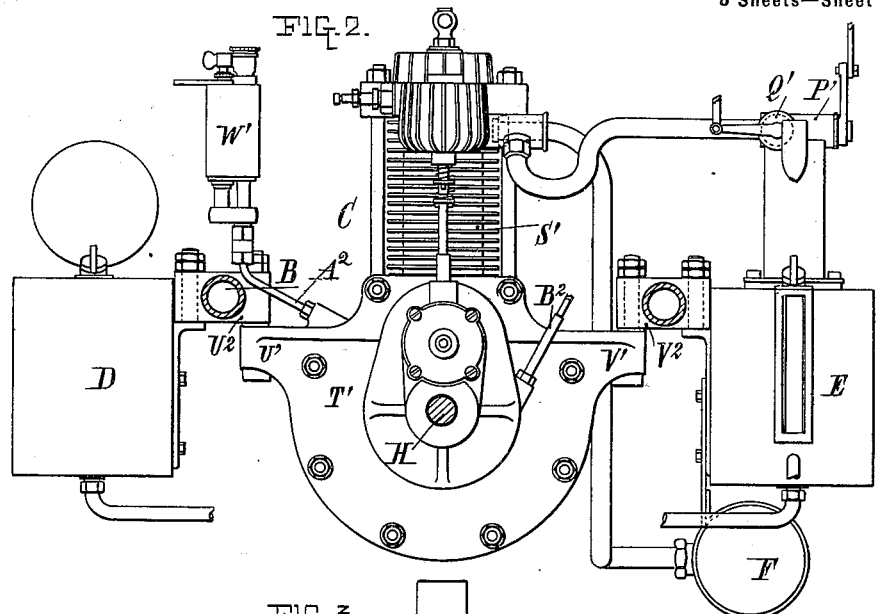
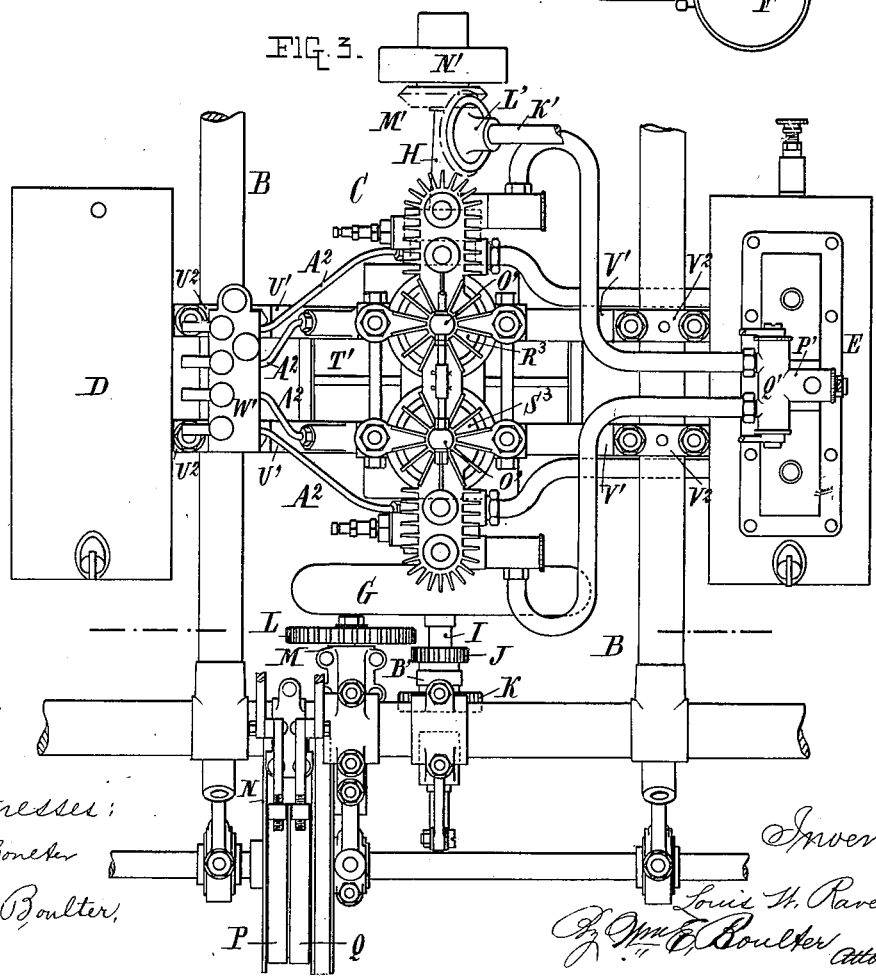

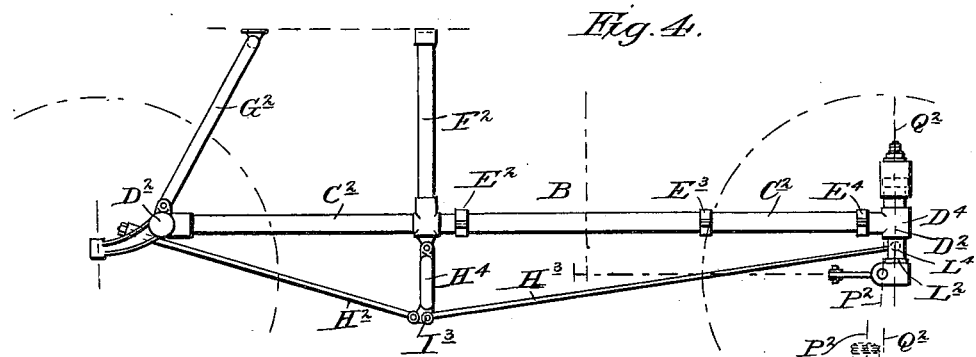
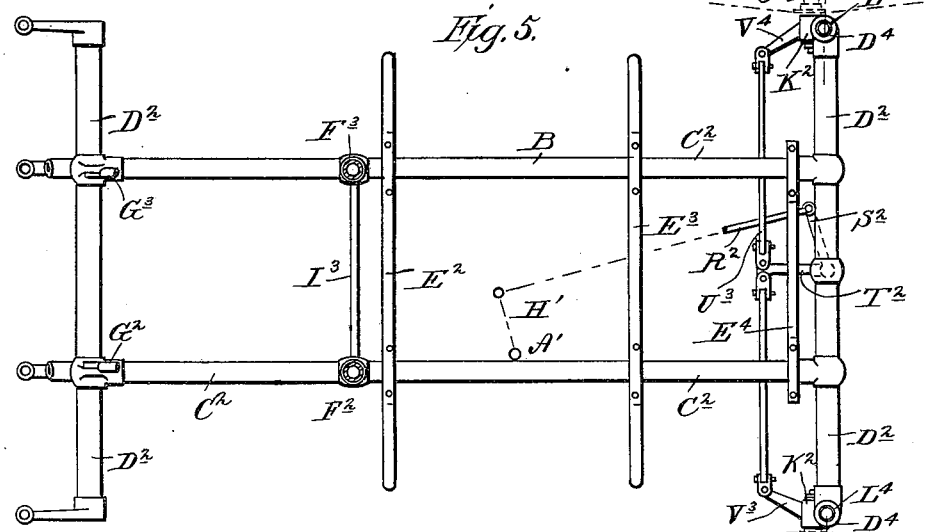
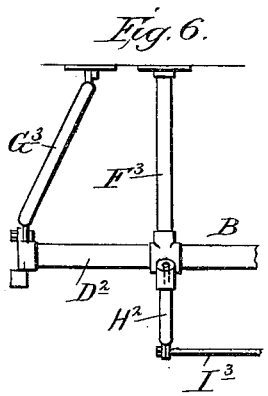
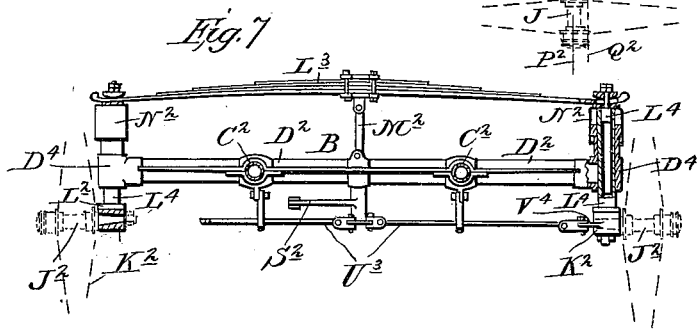

Witnesses
Inventor
Louis W. Ravenèz
Attorney

THE NORRIS PETERS CO., PHOTO-LITHO., WASHINGTON, D. C.

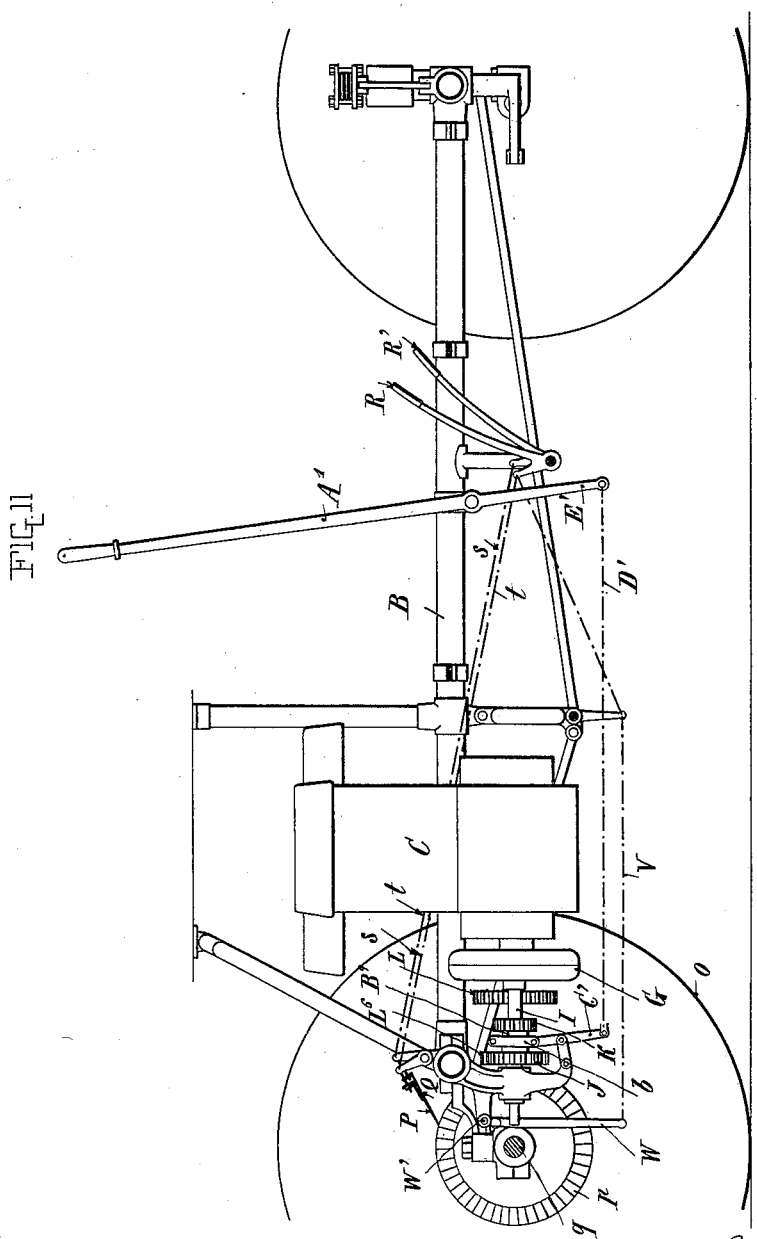

UNITED STATES PATENT OFFICE.

LOUIS WOLDEMAR RAVENÈZ, OF PARIS, FRANCE, ASSIGNOR TO THE SOCIÉTÉ NOUVELLE DES ÉTABLISSEMENTS DECAUVILLE AÎNÉ, OF SAME PLACE.

MOTOR-VEHICLE.

SPECIFICATION forming part of Letters Patent No. 650,950, dated June 5, 1900.

Application filed March 3, 1898. Serial No. 672,418. (No model.)

*To all whom it may concern:*

Be it known that I, LOUIS WOLDEMAR RAVENÈZ, a citizen of the French Republic, residing at Paris, France, have invented certain new and useful Improvements in or Relating to Motor-Vehicles, of which the following is a specification.

This invention relates to improvements in motor-vehicles, the essential features of which are hereinafter described, and illustrated, by way of example, in the accompanying drawings, in which—

Figure 8:
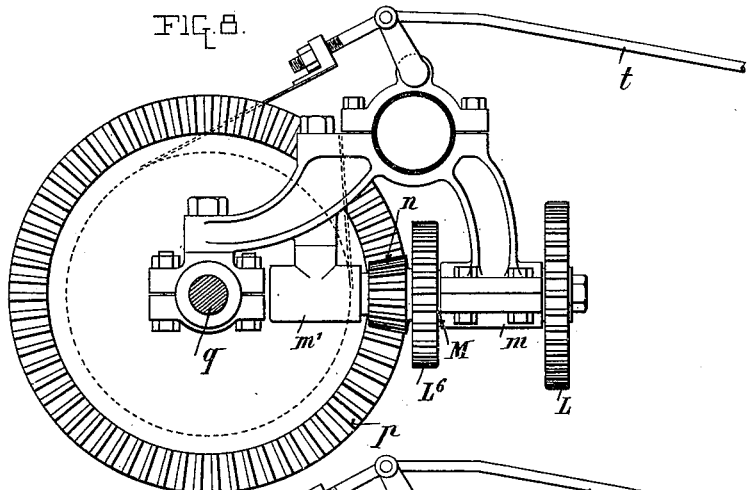
Figure 9:
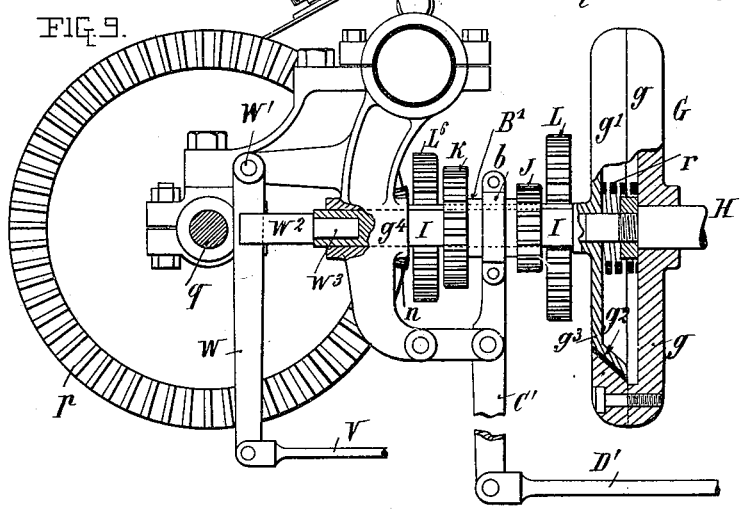
Figure 10:
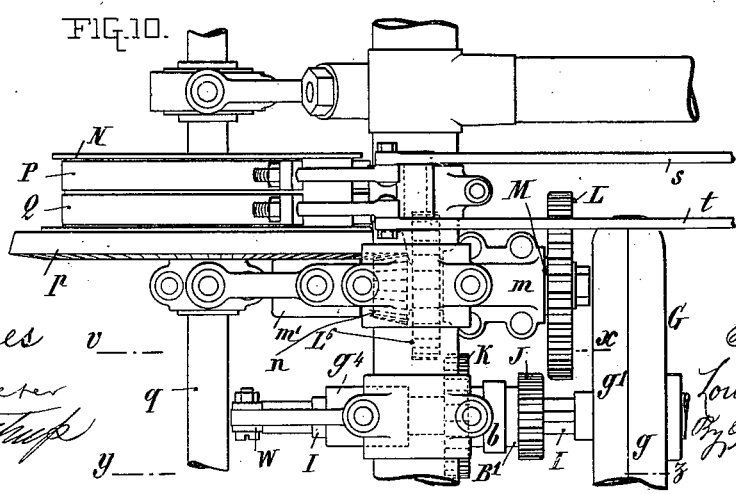

Figure 1 is a longitudinal elevation, partly broken away, of a motor-vehicle, according to this invention. Fig. 2 is a partial back elevation; Fig. 3, a partial plan corresponding to Fig. 2. Figs. 4, 5, 6, and 7 are detail views, being, respectively, a longitudinal elevation, a plan, and cross-section of the construction of framing and steering-gear and method of suspension. Figs. 8, 9, and 10 are views of details on a larger scale, Fig. 8 being a section on the line $v\,x$ of Fig. 10 and Fig. 9 a section on the line $y\,z$ of the same figure, while Fig. 10 is a plan view of the device for the gearing for effecting variation of speed as well as of the brake device of the same. Fig. 11 represents a longitudinal elevation of the vehicle, illustrating in outline the connection of the operating-levers with their respective parts.

The carriage-frame is arranged to rest on the longitudinal member B, the construction of which will be hereinafter described, and below it are arranged, also supported by the said longitudinal member B, the motor C, with all its accessories, such as the petroleum-reservoir D, the carbureter E, and the exhaust-silencer F, as well as the gearing for actuating the rear wheels of the vehicle from the motor. This actuating mechanism comprises a coupling-disk G, actuated by the shaft H of the motor and acting as a fly-wheel to the said motor. This disk consists of two parts $g\,g^2$, of which one, $g$, is concentrically fixed on the shaft H and is provided with a crown or ring $g'$, secured to it, the inner side of the latter being conically shaped so as to correspond with the periphery of the second part $g^2$, which is likewise conically shaped and comprises a plate $g^3$, resting freely with its center on the end of the shaft H and capable of sliding longitudinally on it. The plate $g^3$ is fixed to the end of a shaft I in line with the shaft H and can revolve in the support $g^4$. The shaft I is provided with a sleeve B', which can slide longitudinally on it, but is fixed to it as regards the rotary movement of the shaft I, say by a key. On this sleeve B' are arranged pinions J and K, of different diameters, for transmission of movement and change of speed. The sleeve B', moreover, is provided with a collar $b$, which by means of levers C', D', and E', actuated by the hand-lever A', can displace the sleeve B' and with it the pinions J K, so that one or the other of the latter will, according to the speed desired, gear with the corresponding pinions L $L^6$, keyed on the shaft M, arranged parallel to the shaft I and carried in bearings $m\,m'$, conveniently attached to the longitudinal frame of the vehicle. The shaft M is also provided with a conical toothed pinion $n$, which transmits by means of a bevel-wheel $p$ the movement to the axle $q$, on which is arranged a differential gear device for facilitating the turning of the vehicle, which device is contained in a drum N, rigidly fixed to the bevel-wheel $p$. The rear driving-wheels O of the vehicle are fast with the axle $q$ and so partake of its rotation in either a forward or backward direction.

On the outside of the drum N are arranged two brake-bands P and Q, actuated independently of each other by a system of levers and connecting-rods $s\,t$, which in turn are actuated by pedals R R', placed side by side and arranged at the bottom of the carriage, so as to be easily worked by the feet of the driver of the car. The band Q acts along and is actuated by the pedal R' in case a simple reduction of speed is required, while the band P is actuated by the pedal R, in combination with the friction-gearing G, when a sudden stoppage is required. For this purpose the engagement or disengagement of the two parts $g$ and $g^2$ of the friction device G is effected by means of the longitudinal displacements in one or the other direction of the shaft I, which movement is effected by means of a lever W pressing below its point of suspension W' on a bolt W², pivotally mounted at W³ on the end of said shaft and actuated by the rod V, connected by a convenient system of levers with the pedal R in such a manner that when the brake-band P is actuated by means of the said pedal the disengagement of the friction device is obtained, while the engagement is effected by the action of the spring r between the two plates g and g². Within the reach of the driver is also the handle-bar G' on the top of the steering-rod F', the lower end of which is provided with an arm H', operating the front steering-wheels I', as will be hereinafter described; also, the starting hand-wheel J', which when turned causes its spindle K' to turn, said spindle carrying at its lower end a bevel-pinion L', engaging with a corresponding pinion M', combined with a pawl-gear N', keyed on the front end of the shaft H of the motor, and, finally, a small handle for operating pressure-cocks O' of the cylinders of the motor, and these small levers are adapted to be held in variable positions on notched and graduated segments, said levers controlling, respectively, the proportions of the explosive mixture by means of the cock P', the admission of the charge to the motor by means of the double cock Q', and the retarding or accelerating of the ignition by means of an electric device producing a spark in the explosion-chambers.

The motor C has two cylinders R³ S³, each comprising a valve-chest, explosion-chamber, electric igniting device, and the usual accessories. The bed-plate or casing of the motor consists of two symmetrical parts secured together and forming a box T', supporting the cylinders. This box or casing completely incloses the cranks and fly-wheels and is secured by means of lugs or projections U' V' to the framing B by means of collars U² V², secured to the longitudinal members of said frame. On each side of the motor C are symmetrically arranged (also supported by the collars U² V²) an oil-tank D and carbureter E, supplied from the former. A single automatic lubricating device W' lubricates all the parts through suitably-arranged tubes A². A tube B² serves to relieve any excessive pressure that may be produced in the box T', owing to the rotation of the parts within it. The cylinders of the motor, as well as their valve-chests and explosion-chambers, are provided with very thin radiating plates or ribs of such surface as to insure these parts being kept sufficiently cool.

The framing B, made, preferably, of steel tubing, is constituted by two parallel longitudinal members C², connected at each end by transverse members D², carrying the axles or journals of the wheels by means of suitable bearings and sockets.

Intermediate transverse bars E² E³ E⁴, as well as vertical uprights F² F³ and inclined uprights G² G³, serve to support and fix the body of the carriage. Ties H² H³, with stays H⁴, are combined with each longitudinal member C² for the purpose of strengthening and increasing the rigidity of the frame B. The stays H⁴ are connected at their lower ends by a cross-stay I³, insuring and completing the rigidity and strength of the whole.

The front wheels I' are carried by the front transverse rod D² of the frame B, provided for this purpose with vertical sockets D⁴ at their ends. The axles J² of the wheels are held horizontally in sockets K², provided with a vertical spindle L⁴, passing through the sockets D⁴ with a slight amount of friction. The lower ends of these spindles form, near the sockets K², shoulders L², their upper ends projecting beyond the sockets D⁴, being respectively attached to corresponding ends of a laminated suspension-spring L³, attached at its center to the fixed cross-bar D² of the frame B by means of a rod M². The guiding and support of the spindles L⁴ are completed by means of caps N² at their upper ends adapted to slide over the upper portion O² of the sockets D⁴, which they serve as a cover.

To insure complete stability of steering—that is to say, to render it insensible to shocks which in motor-vehicles of the usual construction compel the driver to hold the steering-handle securely and continuously—the handle operating the steering-rod, the axes P², Fig. 5, of the journals of the front wheels, and the axes Q² of the corresponding spindles L⁴ are arranged in different vertical planes, as may be seen in Figs. 1, 4, and 5, where the axis P² is nearer the center of the frame B than the axis Q².

The steering is effected by means of hinged levers R² S² T² U³, Fig. 5, these latter levers U³ being connected to rods V³ V⁴, secured to the sockets supporting the axle-journals.

I claim—

1. In a motor-vehicle, the combination with a metallic frame B, a carriage-body A carried by said frame and secured to it by means of transverse bars, vertical uprights F² and inclined uprights G², the motor mechanism arranged at the back of the vehicle below the main seat of the vehicle, the steering-rod F', the lever A' for throwing the driving and speed-changing mechanism in or out of gear, a pedal R adapted to operate the brake, the hand-wheel J' adapted to operate the spindle for starting the motor, and levers or handles by means of which the working of the motor is regulated all arranged substantially as described.

2. Motor mechanism and transmission-gear comprising a motor C a casing T' having lugs U' V' for securing it to the carriage-frame, the shaft of said motor being combined with bevel-pinions L' M' and a pawl device N' for starting, effected by means of the spindle K', and also with a friction coupling-disk G transmitting motion to a shaft, a sleeve B' on the latter shaft and provided with toothed wheels J K for transmitting motion and changing the rate of speed of the vehicle, the sleeve being movable longitudinally on its shaft, a shaft M, toothed wheels L L⁶ mounted thereon, a lever A' adapted to move the sleeve for the purpose of bringing the wheels J K into engagement with the toothed wheels L L⁶ as set forth and differential gearing between the shaft M and the rear wheels of the vehicle, substantially as described.

3. The combination with the periphery of the drum of the differential gear N, of two brake-bands, one being adapted to work singly and independently of the other for obtaining reduction of speed, the second band operating to stop the vehicle in combination with the friction coupling-disk G in such manner that said disk is thrown out of gear, the motor being disconnected from the transmission-gear before the action of the brake-band takes place, substantially as described.

4. The suspension and front steering device comprising a transverse laminated spring L³ secured at its center to the transverse member D² by means of a rod M² and attached at its ends to the upper ends of vertical spindles L⁴ sockets carrying the axles of the road-wheels, said spindles passing with a slight amount of friction through the sockets D⁴ formed at the ends of the transverse member D² and being nearer the central axis of the carriage than the axles of the road-wheels, substantially as and for the purpose described.

5. In a vehicle the combination with the body, of the front transverse rod having vertical sockets at the ends, the front-wheel axles, the horizontal sockets therefor, spindles passing vertically through the latter sockets and the vertical sockets, and a transverse spring having its ends attached to the upper projecting ends of the vertical spindles.

6. In a vehicle the combination with the body, of the front transverse rod having vertical sockets at the ends, the front-wheel axles, the horizontal sockets therefor, spindles passing vertically through the latter sockets and the vertical sockets, and a transverse spring having its ends attached to the upper projecting ends of the vertical spindles, and caps carried by the spindles and adapted to slide over the upper portions of the vertical sockets.

7. In a motor-vehicle the combination with a motor and its shaft, of a starting device comprising a rotatable shaft, a bevel-pinion thereon, a pawl-gear on the motor-shaft, and a bevel-pinion combined with said pawl-gear with which latter pinion the first-named bevel-pinion meshes.

In witness whereof I hereto set my hand in the presence of the two subscribing witnesses.

LOUIS WOLDEMAR RAVENÈZ.

Witnesses:
LOUIS LALLESJER,
EDWARD P. MACLEAN.